United States Patent
Saito et al.

(10) Patent No.: US 9,348,024 B2
(45) Date of Patent: May 24, 2016

(54) ACTIVE SONAR APPARATUS, ACTIVE SONAR SIGNAL PROCESSING METHOD, AND RECORDING MEDIUM STORING SIGNAL PROCESSING PROGRAM THEREOF

(71) Applicant: NEC CORPORATION, Tokyo (JP)

(72) Inventors: Ryohei Saito, Tokyo (JP); Masumi Imaizumi, Tokyo (JP); Koji Goto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 378 days.

(21) Appl. No.: 13/944,631

(22) Filed: Jul. 17, 2013

(65) Prior Publication Data

US 2014/0036631 A1  Feb. 6, 2014

(30) Foreign Application Priority Data

Aug. 2, 2012 (JP) ................. 2012-172194

(51) Int. Cl.
  *G01S 15/00* (2006.01)
  *G01S 15/04* (2006.01)
  *G01S 7/527* (2006.01)
  *G01S 7/53* (2006.01)

(52) U.S. Cl.
  CPC ............ *G01S 15/04* (2013.01); *G01S 7/527* (2013.01); *G01S 7/53* (2013.01)

(58) Field of Classification Search
  CPC .................................. H04R 1/00; G01S 1/00
  See application file for complete search history.

(56) References Cited

U.S. PATENT DOCUMENTS

| | | | | |
|---|---|---|---|---|
| 4,110,746 A | * | 8/1978 | Furukawa | ............ H03M 1/00 324/99 D |
| 2003/0227823 A1 | * | 12/2003 | Carter | ............ G01S 7/5273 367/107 |
| 2010/0145708 A1 | * | 6/2010 | Master | ............ A47C 21/003 704/270 |
| 2012/0075956 A1 | * | 3/2012 | Kurpiewski | ............ G01S 7/536 367/87 |

FOREIGN PATENT DOCUMENTS

| | | |
|---|---|---|
| JP | 2004-118108 A | 4/2004 |
| JP | 2005-351721 A | 12/2005 |
| JP | 2009-253911 A | 10/2009 |

* cited by examiner

*Primary Examiner* — Shirley Lu
(74) *Attorney, Agent, or Firm* — Sughrue Mion, PLLC

(57) ABSTRACT

An active sonar apparatus which emits a sound wave and detects a target object based on a sound reflected by this target object including an FFT part which performs the fast Fourier transform of the received sound wave to derive a frequency spectrum and outputs this as an FFT signal, a normalization part which normalizes the FFT signal and outputs this signal as a normalized signal, and a noise elimination unit which performs a plurality of smoothing processes to the normalized signal, combines the signals to which the smoothing processes are performed to generate a combined signal, and outputs the combined signal in which a noise received together with the reflected sound is suppressed.

15 Claims, 7 Drawing Sheets

ACTIVE SONAR APPARATUS, ACTIVE SONAR SIGNAL PROCESSING METHOD, AND RECORDING MEDIUM STORING SIGNAL PROCESSING PROGRAM THEREOF

This application is based upon and claims the benefit of priority from Japanese Patent Application No. 2012-172194, filed on Aug. 2, 2012, the disclosure of which is incorporated herein in its entirety by reference.

TECHNICAL FIELD

The present invention relates to an active sonar apparatus, an active sonar signal processing method, and a recording medium storing a signal processing program thereof.

BACKGROUND ART

Generally, an active sonar emits sound waves into the seawater and receives the sound waves reflected by the target object. The position of the target object and the distance to the target object are measured by using the time difference between sound emission and reception and the incident direction of the reflected sound waves. However, the received sound includes noise generated by waves or the like besides the reflected sound. Accordingly, it is difficult to detect the target object with a high degree of accuracy. Various ideas for improving the detection accuracy are offered.

For example, a method by which even a broadband signal can be detected is disclosed in Japanese Patent Application Laid-Open No. 2004-118108. In this method, by performing an FFT process of acoustic signal data, a time integration is performed for each frequency and a local average value of a section length of a predetermined frequency is obtained. An amplitude level of the frequency is divided by the local average value to perform local normalization. After this, a frequency width that is set in advance is used as an average section length and the local average value is obtained. By replacing the amplitude level value of the frequency with the local average value, the noise is eliminated.

In Japanese Patent Application Laid-Open No. 2005-351721, a method by which by compressing beam data obtained by performing directivity synthesis for each direction into an amount of one channel, a signal is displayed without losing a process gain of the directivity synthesis process is disclosed. In this method, a plurality of directive beams are formed, a frequency analysis is performed, an average level of the noise is calculated, and the normalization is performed. Additionally, the normalized signal is integrated to suppress the noise variation.

Further, a method for detecting a carrier with high accuracy is disclosed in Japanese Patent Application Laid-Open No. 2009-253911. In this method, an input signal is Fourier transformed, a power operation is performed over an integration period, and a normalized autocorrelation value in which noise is suppressed is calculated. It is determined whether or not a narrowband signal is included in a desired frequency bin according to whether or not the normalized autocorrelation value is greater than a threshold value.

However, it is difficult to sufficiently suppress the noise by the method described in each patent document mentioned above. For example, in the method disclosed in Japanese Patent Application Laid-Open No. 2004-118108, the time integration is performed for each frequency by performing the FFT process on the acoustic signal data. However, because the integration time constant used in the integration is fixed, there is a case in which it does not correspond to the frequency of the noise. Namely, when it is considered that a sound source of the noise is a wave, there are two types of waves: a deep-surging wave and a breaking wave. Namely, the frequency of the wave is not a single frequency. Accordingly, even when the time integration is performed for each frequency, the noise cannot be sufficiently suppressed when the integration time constant is fixed.

SUMMARY

Accordingly, a main object of the present invention is to provide an active sonar apparatus of which even when noise includes a plurality of frequency components, the noise can be efficiently suppressed and target object detection accuracy is improved, an active sonar signal processing method, and a signal processing program.

BRIEF DESCRIPTION OF THE DRAWINGS

Exemplary features and advantages of the present invention will become apparent from the following detailed description when taken with the accompanying drawings in which.

EXEMPLARY EMBODIMENT

First Exemplary Embodiment

Figure 1:
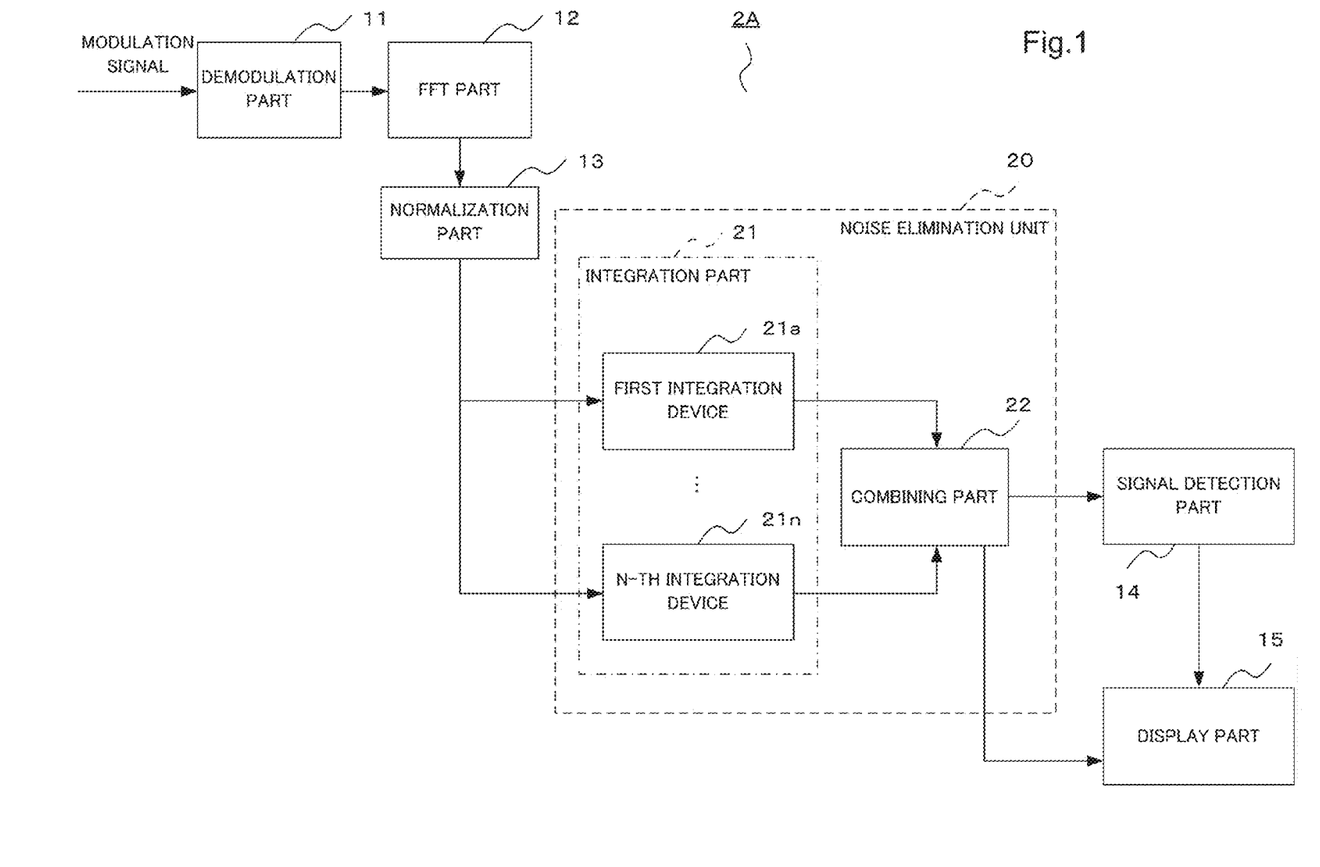
FIG. 1 is a block diagram of an active sonar apparatus according to a first exemplary embodiment of the present invention.

A first exemplary embodiment of the present invention will be described. FIG. 1 is a block diagram of an active sonar apparatus 2A according to the exemplary embodiment. The active sonar apparatus 2A comprises a demodulation part 11, an FFT part 12, a normalization part 13, a noise elimination unit 20, a signal detection part 14, and a display part 15.

The active sonar apparatus 2A emits a search sound and receives the reflected sound. The demodulation part 11 converts an analog signal that is the received reflected sound into a digital signal (A/D conversion). Further, the search sound can be emitted by using various methods. In this exemplary embodiment, as an example, a PCW (Pulsed Continuous Wave) of which a frequency of the search sound is fixed will be described.

The FFT part 12 performs an FFT process on the A/D converted signal. By this FFT process, a signal is cut out with a predetermined time window, acoustic signal data for each cutout time is fast Fourier transformed, and the frequency spectrum is derived.

The normalization part 13 normalizes the signal to which the FFT process is applied and outputs it as the normalized signal. A publicly known method can be used for this normalization method. For example, a local average value in a predetermined frequency section length is calculated for each frequency and an amplitude level of the frequency is divided by the average value to perform a local normalization. Such local normalization is performed for all the frequencies in series.

The noise elimination unit 20 includes an integration part 21 and a combining part 22. The integration part 21 includes a first integration device 21a to an N-th integration device 21n. The first integration device 21a to the N-th integration device 21n whose integration time constants are different from each other integrate the normalized signal. Where, N is a positive integer of two or more.

Further, as the integration time constant, for example, when the integration time constant t of the first integration device 21a is t1, the integration time constant tk of the k-th integration device may be t1/k. Where, k is a positive integer which satisfies 1<k<N. In this case, it is desirable that the integration time constant t of the first integration device 21a is set based on the general noise frequency.

The combining part 22 combines the integrated signals from all the integration devices 21a to 21n and generates the combined image data.

Figure 2:
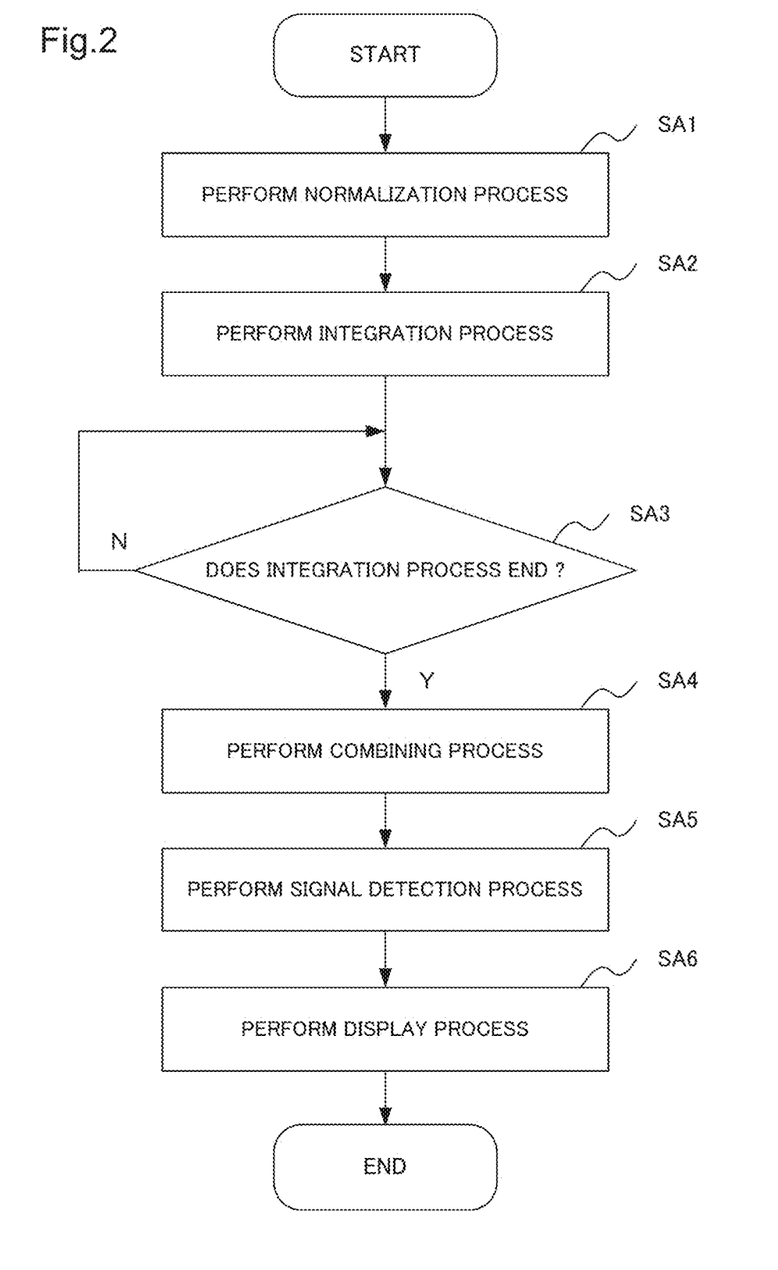
FIG. 2 is a flowchart showing a signal processing procedure of an active sonar apparatus according to a first exemplary embodiment.

Next, the signal processing procedure in such active sonar apparatus 2A will be described. FIG. 2 is a flowchart showing the signal processing procedure.

Step SA1: A reception signal is inputted to the normalization part 13 via the demodulation part 11 and the FFT part 12. It is normalized by the normalization part 13.

Steps SA2 and SA3: The normalized signal obtained by the normalization process of the normalization part 13 is inputted to the first integration device 21a to the N-th integration device 21n. Each of the integration devices having the different integration time constants from each other that are set in advance performs the integration.

Further, all the integration devices have the different integration time constants from each other and perform the integration. The reason will be described below. Namely, a power of noise such as the sound of waves or the like included in the reflected sound conforms to a Rayleigh distribution and the duration of noise is short. In contrast, usually, the power of the sound reflected by the target object is constant and continues for a certain period of time. Further, the difference of the duration is a relative value representing the difference between the sound reflected by the target object and the noise. Accordingly, the time corresponding to the duration of the noise is used as the integration time constant. Because the integration process is similar to a smoothing process, the noise can be efficiently suppressed by using the integration time constant that is set based on the duration of the noise.

Because all the integration devices do not always output the signal synchronously, the operation is waited until all the integration devices end the integration process.

Step SA4: The outputs of the integration devices (the first integration device 21a to the N-th integration device 21n) are combined by the combining part 22. The noises in the outputs of all the integration devices are suppressed. Accordingly, in the combined signal obtained by combining these signals, the signal of noise (the signal whose duration is short) is suppressed and the signal of the sound reflected by the target object (the signal whose duration is long) is emphasized.

Step SA5: Next, a threshold process is performed to the combined signal. This threshold process extracts a signal whose level exceeds the predetermined threshold value. Because the signal of the sound reflected by the target object (the signal whose duration is long) is emphasized, the signal showing the target object can be easily extracted.

Step SA6: By the above-mentioned operation, the combined signal from the combining part 22 and the detection signal from the signal detection part 14 are inputted to the display part 15. The display part 15 displays an image (hereinafter, it is referred to as a basic image) based on the combined signal and also displays a detection image based on the detection signal so as to superimpose it on this basic image. Of course, the basic image can be displayed with character information, a numerical information, a mark, or the like instead of superimposing the detection image.

Figure 3A:
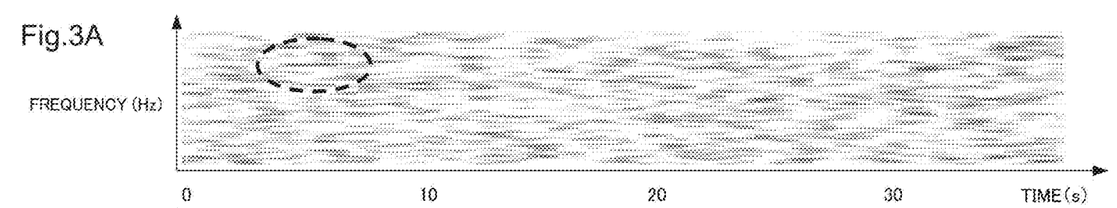
FIG. 3A shows an image based on a normalized signal in a processing stage of an active sonar apparatus according to a first exemplary embodiment.
Figure 3B:
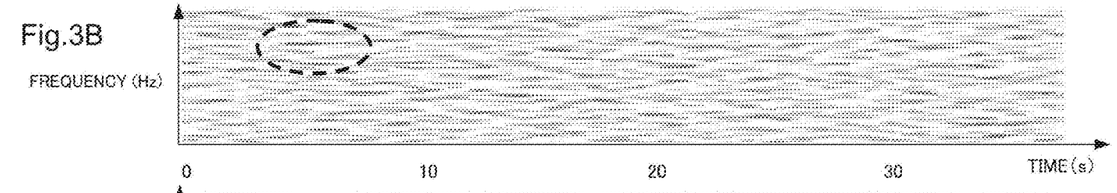
FIG. 3B shows an integration image obtained by a moving average of three cells in a processing stage of an active sonar apparatus according to a first exemplary embodiment.
Figure 3C:
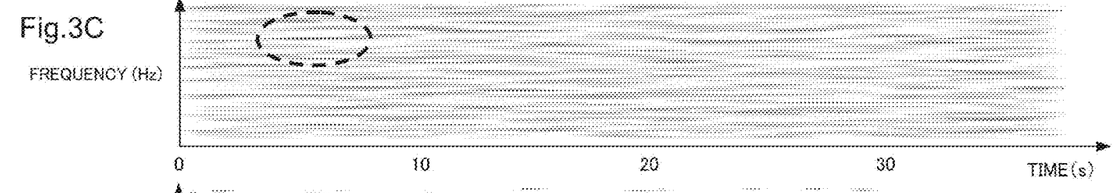
FIG. 3C shows an integration image obtained by a moving average of twenty cells in a processing stage of an active sonar apparatus according to a first exemplary embodiment.
Figure 3D:
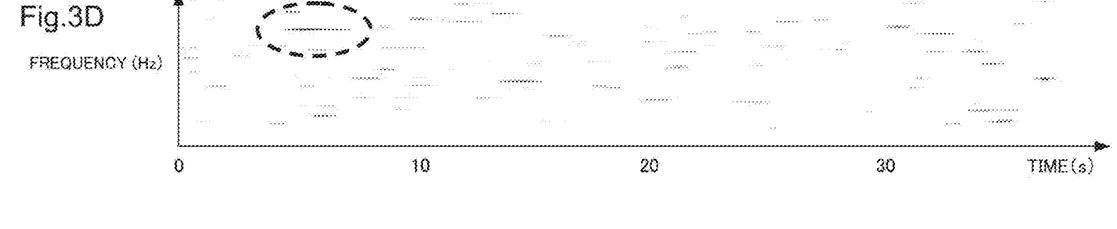
FIG. 3D shows a combined image obtained by combining an integration image obtained by a moving average of three cells and an integration image obtained by a moving average of twenty cells in a processing stage of an active sonar apparatus according to a first exemplary embodiment.

FIG. 3A to FIG. 3D show the images in respective processing stages. FIG. 3A shows the image (original image) based on the normalized signal, FIG. 3B shows the integration image obtained by a moving average of three cells, and FIG. 3C shows the integration image obtained by a moving average of twenty cells. FIG. 3D shows the combined image obtained by combining the image shown in FIG. 3B and the image shown in FIG. 3C. Further, in FIG. 3A to FIG. 3D, the horizontal axis is time and the vertical axis is frequency. In FIG. 3, a black line shows the frequency of the sound reflected by the target object or noise. From FIG. 3, it is understood that the line in an area surrounded by the dotted line indicates the target object.

From FIG. 3, it can be understood that an image density becomes smaller with the increase of the integration time constant (the number of cells of the moving average) but the image comes to be extended in a direction of time. The image density becomes smaller with the increase of the integration time constant. The reason to which the image density became small is because the noise is suppressed. Further, the reason to which the image was extended in the direction of time is because the signal integrated time. However, even when the moving average of at least twenty cells is used, the line representing the target object remains in the image without being suppressed.

FIG. 3D shows an image obtained when the image shown in FIG. 3B and the image shown in FIG. 3C are combined and the threshold process is performed based on the result. The noise is eliminated by a combining process. Therefore, when the threshold process is performed to the combined image, the signal from the target object is extracted and additionally, the blur is eliminated.

As described above, by integrating the signal (normalized signal) including noise by a plurality of integration devices whose integration time constants are different from each other and combining the integrated signals, the image in which the noise is suppressed and the signal of the target object is emphasized can be obtained. Accordingly, an ability to distinguish the target object is improved and an active sonar apparatus having high reliability can be provided.

Second Exemplary Embodiment

Next, a second exemplary embodiment of the present invention will be described. Further, the same reference numbers are used for the components having the same configurations as those of the first exemplary embodiment and the description of the components will be omitted appropriately.

In the first exemplary embodiment, the integration time constant of each integration device is set in advance. In contrast, in this exemplary embodiment, the integration time constant is automatically detected and set.

Figure 4:
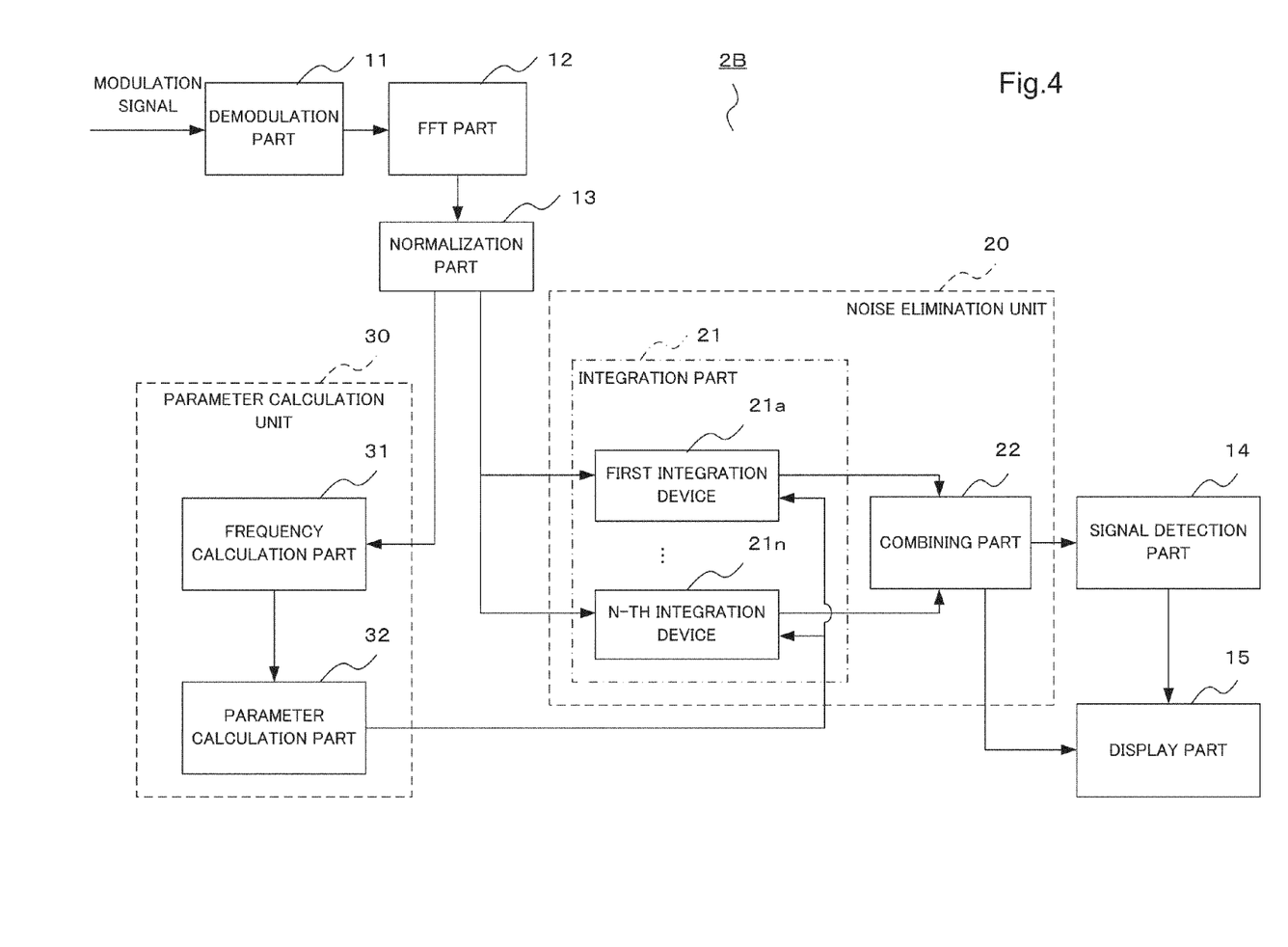
FIG. 4 is a block diagram of an active sonar apparatus according to a second exemplary embodiment of the present invention.

FIG. 4 is a block diagram of an active sonar apparatus 2B according to this exemplary embodiment. The active sonar apparatus 2B according to this exemplary embodiment includes a parameter calculation unit 30 in addition to the components included in the active sonar apparatus 2A according to the first exemplary embodiment. The parameter calculation unit 30 automatically detects the integration time constant and sets it.

The parameter calculation unit 30 includes a frequency calculation part 31 and a parameter calculation part 32. The sound wave received by the active sonar apparatus includes the reflected sound of which the emitted sound wave is reflected by the target object and a sound from an object which generates a sound by itself such as waves or the like. The sound of waves is considered as noise from the point of view of the target object detection.

Accordingly, in this exemplary embodiment, the integration time constant of the noise is calculated from the sound received in a state in which the sound wave for detecting the target object is not emitted. For this purpose, the frequency calculation part 31 acquires a frequency characteristic of the noise and calculates the integration time constant from the frequency characteristic acquired by the parameter calculation part 32.

Figure 5:
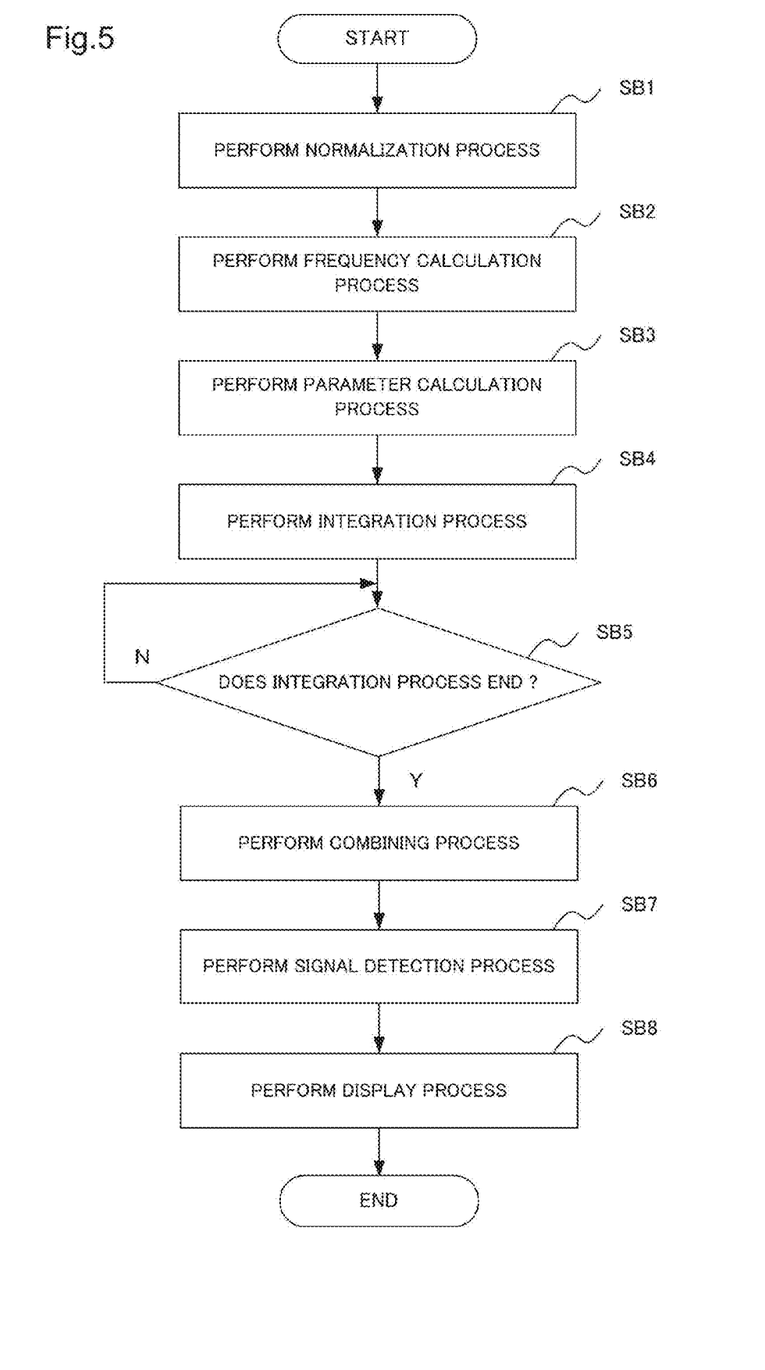
FIG. 5 is a flowchart showing a signal processing procedure of an active sonar apparatus according to a second exemplary embodiment.

FIG. 5 is a flowchart showing a signal processing procedure of such active sonar apparatus 2B. Further, a variation frequency calculation process of step SB2 and a parameter calculation process of step SB3 are added to the signal processing procedure shown in FIG. 2. Namely, step SB1 corresponds to step SA1 and step SB4 to step SB8 correspond to step SA2 to step SA6. Accordingly, the description of the corresponding step will be omitted.

Step SB2: The frequency calculation part 31 calculates a frequency of variation in signal level from the normalized signal. FIG. 3A shows the displayed image that is generated from the normalized signal. The image is splashed with black and white. Further, for convenience of the display, black and white colors are used and this means that one data (detected data) is superior to the other. In FIG. 3, the black line means superior data. Hereinafter, the superior data is represented by the black line.

The superior data whose duration is long indicates a noise and a signal from the target object and the superior data whose duration is short indicates a signal based on the noise. However, the image that is generated from the normalized signal of the sound wave received when the sound wave for the target detection is not emitted is similar to the image shown in FIG. 3A. This means that the noise has the various durations. Accordingly, the frequency calculation part 31 measures the duration of the superior data for each frequency.

Step SB3: The parameter calculation part 32 sets the integration time constant from the duration for each frequency and outputs it to the integration part 21.

Further, in the above-mentioned description, the integration time constant is obtained from the sound wave received in a state in which the sound wave for the target detection is not emitted. However, this exemplary embodiment is not limited to the above-mentioned configuration. For example, when a plurality of measurement times whose time lengths are different from each other exist in the duration of the superior data measured by the frequency calculation part 31, a configuration in which the duration (integration time constant) can be changed based on a display process result may be used in order to set the most suitable duration.

In this case, a user may determine whether or not it is the most suitable duration by looking the displayed image based on the detection signal. However, for example, the user may select the duration of the superior data measured by the frequency calculation part 31 so that the luminance of the image (data of the target object) corresponding to the longest duration is maximum.

As described above, because the integration time constants used by the plurality of integration devices are detected and set automatically, the noise can be suppressed efficiently. Accordingly, an ability to distinguish the target object is improved and an active sonar apparatus having high reliability can be provided.

Third Exemplary Embodiment

Next, a third exemplary embodiment of the present invention will be described. Further, the same reference numbers are used for the components having the same configurations as those of the first exemplary embodiment and the description of the components will be omitted appropriately.

Figure 6:
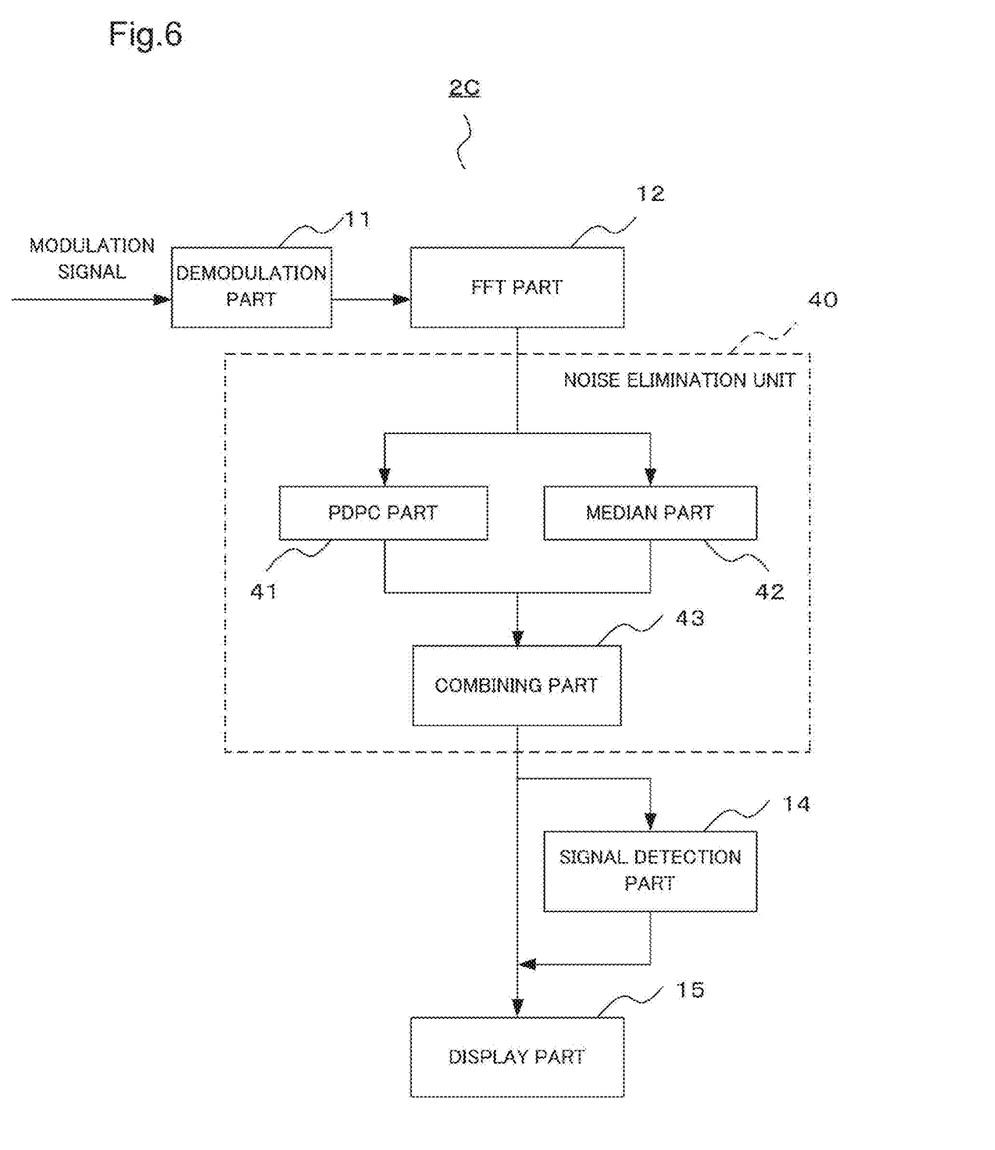
FIG. 6 is a block diagram of an active sonar apparatus according to a third exemplary embodiment of the present invention.

FIG. 6 is a block diagram of an active sonar apparatus 2C according to this exemplary embodiment. The active sonar apparatus 2C includes the demodulation part 11, the FFT part 12, a noise elimination unit 40, the signal detection part 14, and the display part 15. Further, the noise elimination unit 40 includes a PDPC part 41, a median part 42 and a combining part 43. The PDPC part 41 and the median part 42 perform the smoothing process.

In the above-mentioned exemplary embodiments, a case in which a carrier is modulated by a PCW (Pulsed Continuous Wave) modulation method is described in contrast, in this exemplary embodiment, a case in which a carrier is modulated by an LFM (Linear Frequency Modulation) will be described. Further, the LFM modulation is a modulation method by which a frequency linearly changes with time.

Figure 7A:
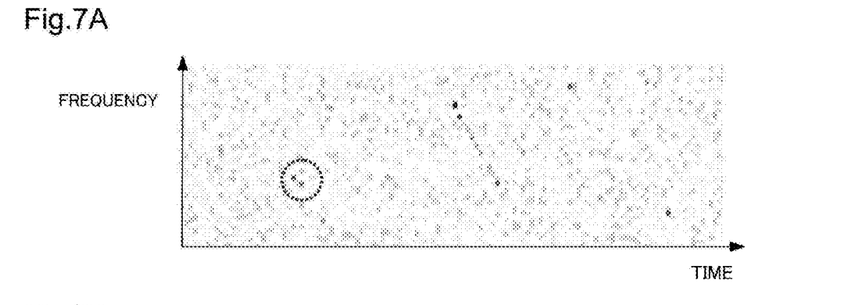
FIG. 7A shows a displayed image that is generated from a normalized signal in a processing stage of an active sonar apparatus according to a third exemplary embodiment.
Figure 7B:
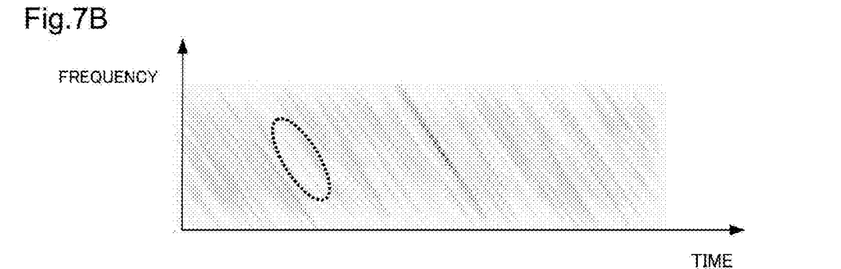
FIG. 7B shows a displayed image of which a PDPC (Post Detection Pulsed Compression) process is applied to a normalized signal in a processing stage of an active sonar apparatus according to a third exemplary embodiment.
Figure 7C:
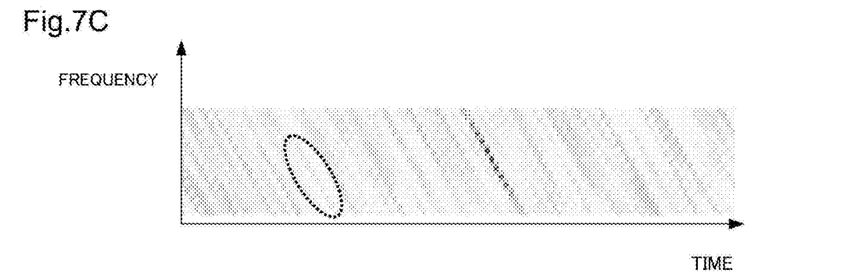
FIG. 7C shows a displayed image of which a median process is applied to a normalized signal in a processing stage of an active sonar apparatus according to a third exemplary embodiment.
Figure 7D:
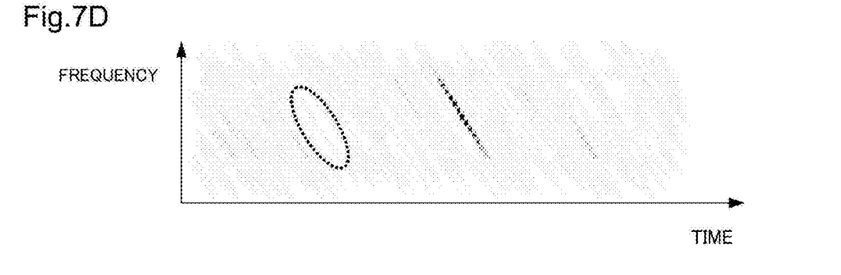
FIG. 7D shows a combined image displayed in a display part that is obtained by combining an image of which a PDPC process is performed and an image of which a median process is performed in a processing stage of an active sonar apparatus according to a third exemplary embodiment.

FIG. 7A shows the image based on the reflected sound of the sound wave which is modulated by the LFM modulation method, emitted, reflected by the target object, and received. In FIG. 7A, a diagonal line from upper left to lower right is shown in the image. Further, FIG. 7A shows a displayed image (original image) that is generated from the normalized signal. FIG. 7B shows a displayed image of which a PDPC process is performed to the normalized signal by the PDPC part 41, and FIG. 7C shows a displayed image of which a median process is performed to the normalized signal by the median part 42. Further, FIG. 7D shows the image obtained by combining the image (FIG. 7B) of which the PDPC process is performed and the image (FIG. 7C) of which the median process is performed. Further, in FIG. 7A to FIG. 7D, an area surrounded by the dotted line corresponds to the salt-and-pepper noise.

Thus, because the image of the normalized signal includes a diagonal line from upper left to lower right, it is desired that the line is not lost by the smoothing process. Accordingly, in this exemplary embodiment, the noise elimination unit 40 is composed of the PDPC part 41 and the median part 42.

The PDPC part 41 performs the smoothing process (PDPC process) by which the smoothing in the oblique direction is performed to the normalized signal. However, when the PDPC process is performed, the blur occurs at an edge of a pixel and the salt-and-pepper noise included in the original image is extended in the oblique direction. Therefore, the judgment whether or not it is the noise becomes difficult.

On the other hand, the median part 42 performs the process (the median process) by which an oblique mask is used, the intensity of the pixel at the center of this mask is used as the intensity of all the pixels in the mask, and the smoothing is performed. When the median process is performed, the blur does not occur at the edge and the salt-and-pepper noise can be eliminated by properly selecting a mask size. However, the image is extended in the oblique direction like the PDPC process.

However, there is a difference between the image obtained by the PDPC process and the image obtained by the median process in a high luminance area. In the image obtained by the PDPC process and the image obtained by the median process, the luminance of the images corresponding to the normalized signal based on the sound reflected by the target object are high but there is a large difference between the luminance of the pixels corresponding to the noise. Namely, there is a large difference in luminance between the image obtained by the PDPC process and the image obtained by the median process and the areas whose luminance are greatly different from each other show the noise.

Accordingly, in this exemplary embodiment, the combining part 43 combines the image obtained by the PDPC process and the image obtained by the median process to eliminate a video generated by the noise (refer to FIG. 7D).

As described above, even when the frequency of the emitted sound wave changes with time, the noise can be efficiently eliminated. Accordingly, an ability to distinguish the target object is improved and an active sonar apparatus having high reliability can be provided.

Further, the signal processing method according to each exemplary embodiment mentioned above can be coded into a program which can be executed by a computer. In this case, the program can be recorded in an information recording medium and distributed. Further, it can be installed in the computer.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:

1. An active sonar apparatus for detecting a position of a target object, the active sonar apparatus comprising:
 a sound emitter configured to emit a sound wave;
 a receiver configured to receive a sound reflected by the target object;
 a memory storing instructions;
 a processor configured to process the instructions to:
   receive the sound reflected by the target object through the receiver;
   perform the fast Fourier transform on the sound to derive a frequency spectrum and outputs this as an FFT signal;
   normalize the FFT signal and outputs this signal as a normalized signal;
   calculate a frequency characteristic of the sound wave received when the sound wave for detecting the target object is not emitted from the normalized signal;
   calculate the integration time constant from the frequency characteristic; and
   perform a noise elimination by performing a plurality of smoothing processes to the normalized signal using different integration time constants, combining the signals to which the smoothing processes are performed to generate a combined signal, and outputting the combined signal in which a noise received together with the reflected sound is suppressed; and
 a display configured to display an image based on the combined signal to indicate the position of the target object.

2. The active sonar apparatus according to claim 1, wherein the integration time constants are in a relation of a multiple.

3. The active sonar apparatus according to claim 1, wherein the processor performs the noise elimination further by:
 performing a post detection pulsed compression (PDPC) procedure perform a smoothing process in a progress direction of time to the normalized signal corresponding to the reflected sound when the frequency of the emitted sound wave changes with time;
 performing a median procedure to perform the smoothing process to the normalized signal corresponding to the reflected sound by using a predetermined mask; and
 combining results of the PDPC procedure and the median procedure and outputs the combined signal in which the noise is suppressed.

4. The active sonar apparatus according to claim 1, wherein the processor is configured to process the instructions to:
 extract data of the target object by performing a threshold process on the combined signal.

5. The active sonar apparatus according to claim 4, wherein the display is further configured to
 display an image based on the extracted data obtained by extracting the target object to superimpose it on the image based on the combined signal.

6. An active sonar signal processing method for detecting a position of a target object, the active sonar signal processing method comprising:
 emitting a sound wave;
 receiving a sound reflected by the target object;
 performing a fast fourier transform (FFT) procedure on the received sound to derive a frequency spectrum and outputting this as an FFT signal;
 performing a normalization procedure on the FFT signal to generate a normalized signal;
 performing a frequency calculation procedure for calculating a frequency characteristic of the sound wave received from the normalized signal when the sound wave for detecting the target object is not emitted;

performing a parameter calculation procedure for computing the integration time constant from the frequency characteristic calculated by the frequency calculation procedure as the integration time constant of the integration procedure; and performing a noise elimination procedure for outputting a combined signal by which a plurality of smoothing processes using different integration times are performed to the normalized signal, the signals to which the smoothing processes are performed are combined, and a noise received together with the reflected sound is suppressed is outputted;

displaying an image based on the combined signal to indicate the position of the target object.

7. The active sonar signal processing method according to claim 6; wherein the integration time constants are in a relation of a multiple.

8. The active sonar signal processing method according to claim 6, wherein the noise elimination procedure, further comprising:

performing a post detection pulsed compression (PDPC) procedure for performing a smoothing process in a direction of time to the normalized signal corresponding to the reflected sound when the frequency of the emitted sound wave changes with time;

performing a median procedure for performing the smoothing process to the normalized signal corresponding to the reflected sound by using a predetermined mask;

performing a combining procedure for outputting the image by which the noise is suppressed by combining the output from the PDPC procedure and the output from the median procedure.

9. The active sonar signal processing method according to claim 6, further comprising:

performing a signal detection procedure for extracting the data of an object by performing a threshold process to the signal outputted from the combining procedure.

10. The active sonar signal processing method according to claim 9, further comprising:

superimposing an image of the target object that is detected by the signal detection procedure on the image based on the combined signals.

11. An information recording medium recording an active sonar signal processing program in a computer-readable form, wherein the active sonar signal processing program comprising:

an instruction for emitting a sound wave;

an instruction for receiving a sound reflected by the target object;

an instruction for performing a fast fourier transform (FFT) procedure on the received sound to derive a frequency spectrum and outputting this as an FFT signal;

an instruction for performing a normalization procedure on the FFT signal to generate a normalized signal;

an instruction for performing a frequency calculation procedure for calculating a frequency characteristic of the sound wave received from the normalized signal when the sound wave for detecting the target object is not emitted;

an instruction for performing a parameter calculation procedure for computing the integration time constant from the frequency characteristic calculated by the frequency calculation procedure as the integration time constant of the integration procedure; and an instruction for performing a noise elimination procedure for outputting a combined signal by which a plurality of smoothing processes using different integration times are performed to the normalized signal, the signals to which the smoothing processes are performed are combined, and a noise received together with the reflected sound is suppressed is outputted;

an instruction for displaying an image based on the combined signal to indicate the position of the target object.

12. The information recording medium which records an active sonar signal processing program according to claim 11, wherein the active sonar signal processing program is characterized in that the integration time constants are in a relation of a multiple.

13. The information recording medium which records an active sonar signal processing program according to claim 11, wherein the noise elimination step of the active sonar signal processing program is characterized by including:

an instruction for performing a post detection pulsed compression (PDPC) procedure for performing a smoothing process in a direction of time to the normalized signal corresponding to the reflected sound when the frequency of the emitted sound wave changes with time;

an instruction for performing a median procedure for performing the smoothing process to the normalized signal corresponding to the reflected sound by using a predetermined mask;

an instruction for performing a combining procedure for outputting the image by which the noise is suppressed by combining the output from the PDPC procedure and the output from the median procedure.

14. The information recording medium which records an active sonar signal processing program according to claim 11, wherein the active sonar signal processing program is characterized by including:

an instruction for performing a signal detection step in which data of the target object is extracted by performing a threshold process to the signal outputted in the combining step.

15. The information recording medium which records an active sonar signal processing program according to claim 14, wherein the active sonar signal processing program is characterized by including an instruction for superimposing an image of the target object that is detected by the signal detection procedure on the image based on the combined signals.

* * * * *